US009663203B2

(12) United States Patent
Sinclair et al.

(10) Patent No.: US 9,663,203 B2
(45) Date of Patent: May 30, 2017

(54) BUOYANCY VEST VENT VALVE WITH RELIABLE SEATING

(71) Applicant: Pandora Underwater Equipment SA, Le Mont-Pelerin (CH)

(72) Inventors: Andrew Sinclair, Les Collons (CH); Christopher Webb, Les Collons (CH)

(*) Notice: Subject to any disclaimer, the term of this patent is extended or adjusted under 35 U.S.C. 154(b) by 0 days.

(21) Appl. No.: 15/048,953

(22) Filed: Feb. 19, 2016

(65) Prior Publication Data
US 2016/0167752 A1   Jun. 16, 2016

Related U.S. Application Data

(63) Continuation-in-part of application No. 14/059,496, filed on Oct. 22, 2013, now abandoned, and a continuation-in-part of application No. 13/432,063, filed on Mar. 28, 2012.

(51) Int. Cl.
*B63C 11/08* (2006.01)
*F16K 24/04* (2006.01)
*F16K 15/18* (2006.01)
*B63C 9/15* (2006.01)

(52) U.S. Cl.
CPC .............. *B63C 11/08* (2013.01); *F16K 15/18* (2013.01); *F16K 24/04* (2013.01); *B63C 9/155* (2013.01); *B63C 2011/085* (2013.01); *Y10T 137/309* (2015.04)

(58) Field of Classification Search
CPC . F16K 15/18; F16K 24/02; B63C 9/24; B63C 9/155; B63C 11/08; B63C 2011/085
USPC ......... 137/115.01, 115.13, 115.23, 485, 488, 137/492, 492.5, 512.2, 516.25, 522, 137/543.15, 854, 493.6; 405/186; 441/96
See application file for complete search history.

(56) References Cited

U.S. PATENT DOCUMENTS

| | | | | |
|---|---|---|---|---|
| 5,823,713 A | * | 10/1998 | Biran | B63C 11/2245 405/186 |
| 6,217,257 B1 | * | 4/2001 | Garofalo | B63C 11/08 405/186 |
| 2013/0255807 A1 | * | 10/2013 | Bonzon | F16K 51/00 137/624.27 |

* cited by examiner

*Primary Examiner* — Mary McManmon
*Assistant Examiner* — Richard K Durden
(74) *Attorney, Agent, or Firm* — Ater Wynne LLP

(57) ABSTRACT

A vent valve for a buoyancy control device suitable for divers, where the valve may be opened by any combination of over-pressure, manual pressure relief or a powered means, where a force to a valve plug is applied by means of a spring that is constrained to prevent entirely lateral and angular movement but in which movement of the plug in the axis of the seat is unconstrained.

6 Claims, 9 Drawing Sheets

DEFLATION OF BCD

DEFLATION OF BCD

Current SUBA configuration

New SUBA configuration

Summary of changes

- Computer – Reduce circuitry onto 1 circuit board
- New Controller – Simplify Puck and Auto Valve into one unit
- Jacket option – New Controller can be used with any make of jacket

BUOYANCY VEST VENT VALVE WITH RELIABLE SEATING

TECHNICAL FIELD

The present invention relates to a vent valve for use on a diver's buoyancy jacket, that is either manually operated or automatically operated.

BACKGROUND

Divers commonly use a Buoyancy Compensation Device (BCD) to compensate for the changes in buoyancy that occur during dive, such as from the compression of the neoprene in a diver's environmental protection suit, or from the consumption of gas in a dive cylinder. A means to add gas to a bladder in the BCD enables the diver's buoyancy to be increased, and vent valves allow gas to be discharged to reduce the diver's buoyancy through a reduction in the water volume displaced by the bladder.

Independent vent valves are fitted to almost all BCDs but are rarely used: the diver tends to favor a composite inflator/dump hose, usually mounted to the left side of BCD. As such, the poor reliability of these valves has not been problematic in product sales, but it is not known to what extent reliability problems result in accidents. Between one third and two thirds of all SCUBA diving accidents are due to buoyancy compensation issues, based on SCUBA accident data published by DAN and BSAC. The reliability of the valve is therefore a prime concern even though the vent valve is used rarely.

The vent valve performs two or three different functions:

1. The valve acts as an over-pressure valve, such that the valve lifts with a pressure greater than that of the hydrostatic diameter of the bladder, then allows gas to vent such that even if the user adds gas continuously to the bladder, the bladder does not over-pressure. This requires a high flow rate through the valve, much higher than the maximum flow rate from the gas addition system.

2. The valve acts as a manual dump valve to allow the user to dump gas from the bladder. This again requires a high flow rate so the user does not have to keep the valve open for long periods.

3. In automatic buoyancy compensators, a third function is required, that of allowing a controller to open the valve under pneumatic, hydraulic or electrical control. The optimal flow rate for this application is usually close to that of the gas addition system, that is, a low flow rate.

Contemporary vent valves often fail to reseat correctly. The causes of incorrect reseating in BCD vent valves are primarily:

1. The compression spring in contemporary valves apply an uneven force to the valve plug, causing it to move at an angle to the axes of the valve seat;

2. The spring attached to the valve plug allows the plug to move from side to side, and may settle on the valve seat when off-center:

3. If the vent is operated in a jerky manner, the spring that pushes the valve plug against the seat can jump out of the retaining channel that keeps it in position, causing further misalignment of the valve plug with respect to the seat.

Various attempts have been made to improve the reliability of BCD valves, including by:

1. Fitting a wave spring instead of a normal compression spring that can reduce the angle at which the valve plug moves in relation to the seat;

2. Use of a deeper channel to keep the spring in the seat. However, the valve plug is still free to move at an angle to the seat, hence the chance of incorrectly seating, and again the spring can oscillate and move out of its channel given a suitable stimulus.

Some applications require the vent valve to be operated from a buoyancy controller. For example U.S. Pat. No. 6,217,257 describes a vent valve that is driven by a pneumatic piston. In the FIG. 1 of that patent, the valve plug moves on a piston, but the sharp edge of the plug shown can reduce the reliability of the valve because when the compression spring applies its force to the plug, the force is not even over the circumference of the spring so one side of the plug is pressed down towards the seat with greater force than the opposing side even though the compression spring contacts both sides on the exterior surface of the plug. That is, the addition of the pneumatic piston arrangement can reduce significantly the reliability of the valve, even though it tends to reduce the side to side movement of the plug.

In applications where a vent valve is operated by a buoyancy controller, it is usually desirable to have a flow rate that is substantially less than that of the same valve when it acts in an over-pressure or manual dump role. A valve that has two distinctly different flow rates, each of which can be set independently at the design stage, is highly preferable to one that has only one rate.

If a volume of gas is in a bladder underwater, then the gas will not flow out of a vent in the bladder unless the vent is higher than the gas: gas does not flow from a low pressure to a high pressure region on its own. In almost all circumstances where the diver wishes to vent gas, the diver's head is above the horizontal, so a single vent valve mounted on the shoulder may suffice as the gas will be near the diver's head when it is required to be vented. In other applications, two, three or more vent valves may be fitted to ensure the diver can vent gas in all circumstances.

The drawback of having a plurality of vent valves is that in the event of an undesirable increase in buoyancy, the diver may have to try each valve in turn in order to identify which one releases gas. Not all the valves may be easily reachable. Where a plurality of valves is fitted, it is desirable to have a method to open all the vent valves simultaneously. It is obvious that if more than one vent valve can be open at once, then one-way valves have to be fitted to prevent water ingress.

In water the ambient pressure will tend to collapse a bladder such that even if the gas is at the same ambient pressure as the vent, it may not flow to the vent unless there is an open gas path from the region containing the gas to the vent. Such gas paths may be kept open within a bladder by fitting a spiral or spring inside the bladder.

The prior art includes various devices that link together multiple pull-cords.

U.S. Pat. No. 6,217,257 describes a diver's buoyancy device with multiple vent valves that are controlled pneumatically, with one-way valves to prevent water ingress.

U.S. Pat. No. 6,217,257 describes the control means to actuate the valve as being a push-button which provides a pressurized gas supply to a piston that lifts the valve. It does not describe how the pressure is released: the patent appears to provide no means to release the pressure. That is, operating the button described in the patent would pressurize the pneumatic line to the vent valve, which in turn would cause the valves to lift, but there is no means to release the gas pressure in the line described so the valve would remain lifted and the buoyancy bladder would lose all its contained gas.

Another limitation of the prior art, such as in the form of a vent valve in U.S. Pat. No. 6,217,257, is that the addition of a pull-cord is not feasible to the form described because the cord would normally feed through the device for which a gas tight connection is required for operation of the device in FIG. 2 of U.S. Pat. No. 6,217,257, Yet another limitation of the prior art, such as U.S. Pat. No. 6,217,257, is that a loss of pneumatic power would result in the valve becoming inoperable.

Yet another limitation of the prior art, such as U.S. Pat. No. 6,217,257, is that it is not possible to open the valve manually because if the pneumatic supply is shut, moving the valve would involve pulling a partial vacuum manually. This aspect would also prevent the valve acting as an over-pressure valve. That is, the valve described in U.S. Pat. No. 6,217,257 may operate as a pneumatically actuated valve but would require separate and parallel valves to provide the over-pressure relief and that would add cost to the BCD.

The activation of pneumatic valves underwater invariably involves power from a gas cylinder, as the use of a flexible gas volume would operate the vents as the volume comes under increasing ambient pressure as the divers depth increases.

PCT/1132013/000581 describes a pneumatically operated valve that overcomes many of the limitations of U.S. Pat. No. 6,217,257 but it does not address the reliability issue, nor any method of providing a dual rate of flow: a high flow rate for the over-pressure and manually activated gas path, and a low flow rate for the pneumatically actuated gas path. The valve in PCT/1132013/000581 would have a low reliability in an automatic buoyancy compensator because the valve would be actuated very many times and even a low rate of failure would result in a high rate of failure on a per dive basis.

Object of the present invention

It is an objective of the present invention to provide a highly reliable vent valve for BCD applications that includes over-pressure and manual vent functions.

It is a further objective of the present invention to provide a vent valve where the valve plug returns to the seat in the same position each time it is actuated.

It is a further objective of the present invention to enable the valve to be driven by a pneumatic or hydraulic power to a BCD vent valve such that a loss of power causes the valve to fail in a safe state.

It is a further objective of the present invention to enable all the vent valves on a BCD to be opened or closed with a single action if required.

It is a further objective of the present invention to provide a vent valve suitable for use by an automatic BCD.

It is a further objective of the present invention to provide manual control of the valves in the event of loss of pneumatic or hydraulic power.

It is a further objective of the present invention to provide the ability to drive the valve from a pneumatic gas line such that when the line is pressurized the valve opens with a flow rate significantly lower than that when opened through the over-pressure valve or manually actuated.

SUMMARY

According to the invention provided is a device for venting gas from a diver's buoyancy compensation bladder, the device comprising a valve plug configured to open or to dose a valve seat, a spring configured to apply force to the valve plug to close the valve seat, a piston configured to apply force to the valve plug to open the valve seat, and a manual pull dump configured to open the valve seat manually wherein the spring is fully restrained for more than 50% of its length, and the movement of the valve plug is constrained by a centering mechanism that prevents the valve plug from moving laterally or angularly while the centering mechanism allowing movement with the face of the valve plug parallel to the valve seat along the axis of a line extending perpendicular to the valve seat under any combination of over-pressure or manual pulling action using the manual pull dump.

Thus, the present invention provides a vent valve that incorporates an over-pressure function, a manual over-ride function and, where required, a powered actuation function, each of which are available at all times to enable the valve to be opened through any one or more of these actions at any time. The valve plug returns to the valve seat when the valve is closed, without the possibility of it moving laterally (sideways across the seat).

According to an embodiment of the invention, the valve plug is configured to be biased to open the valve seat by a pneumatically or hydraulically powered means enabling powered actuation of the valve plug and/or by the manual pull dump enabling manual actuation of the valve plug. And the valve plug is configured to be biased to close the valve seat by a counterforce created by or assisted by the spring providing the instantaneous flow rate from the powered actuation of the valve plug is lower than the instantaneous flow rate from the actuation of the valve plug through over-pressure relief or the manual actuation.

Preferably the valve plug is operable by the powered actuation to open first vent holes and the valve plug is operable by the actuation through over-pressure relief or the manual actuation to open second vent holes wherein dimensions of the first vent holes and the second vent holes define the instantaneous flow rates from the powered actuation of the valve plug and from the actuation of the valve plug through over-pressure relief or the manual actuation.

According to another embodiment of the invention, a piston rod of the piston is configured such that in case of a loss of electrical or gas power the valve plug is operable by the spring to close the valve seat while the valve plug remains operable by the manual actuation.

Thus, the present invention can further provide a fail-safe means to operate the valve using any gas or liquid, whilst maintaining the over-pressure and manual actuation functions.

According to another embodiment of the invention, the valve plug comprises an outer valve plug and an inner valve plug.

According to another embodiment of the invention, the centering mechanism comprises a guide maintaining the valve plug such that the face of the valve plug is parallel to the valve seat at all times, wherein the guide is constrained by a cylinder that forms part of an outer cover of the device.

According to yet another embodiment of the invention, the spring is restrained by walls arranged at the opposite ends of the spring.

DESCRIPTION OF THE DRAWINGS

For a better understanding of the present invention and the advantages thereof and to show how the same may be carried into effect, reference will now be made, by way of example, without loss of generality to the accompanying drawings in which.

DETAILED DESCRIPTION

Figure 1:
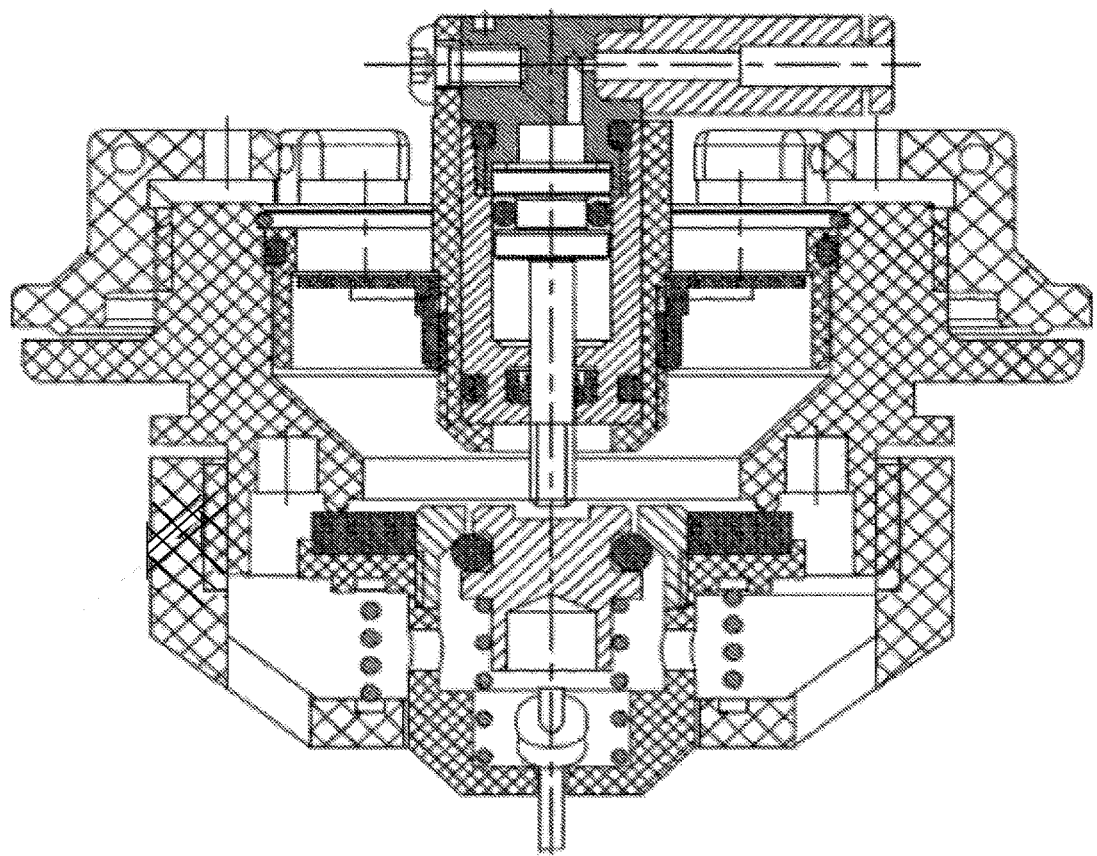
FIG. 1 shows a vent valve according to the present invention in the state where the valve is closed. The valve in this example and the following drawings includes a provision for powered actuation, which is desirable but not a necessary feature of the valve.

The invention will now be described in detail by reference to the aforementioned drawings and by use of example embodiments. Reference is made to a BCD bladder, The form of the bladder is not important: the present invention many be applied to many different types of bladders. The sole special requirement for the bladder to be used with the present invention is that the vent valves shall be arranged such that there is an open gas path from the gas in the bladder to one of the vents: at least one vent valve is required to fulfil this requirement depending on the range of diver attitudes for which the vent function is available.

The vent valves in example embodiments shown in FIGS. 1 to 4 have a conventional manual pull dump (33) in addition to a pneumatically or hydraulically powered piston (27). The pull dump may be on a cord (35) or a lever. A spring (5) applies a pressure to a valve plug (29) to dose a seat (30), but which can be over-ridden by any combination of manual pull action, over-pressure or in these embodiments the powered actuation of the piston. The vent valve shown in FIG. 1 also comprises an inner valve plug 15; however, the vent valve according to another embodiment shown in FIG. 4 comprises only one main valve plug 29.

A compression spring (5) is constrained by walls (8) for more than half its length, which prevents entirely the spring moving laterally (side to side in the drawings). The walls (8) can be arranged from opposite sides of the spring (5) or the walls (8) can have another configuration. The compression spring (5) may be a wire spring or a wave spring, or any other type of spring that applies a force to the valve plug (29) towards the direction of the seat (30).

Figure 2:
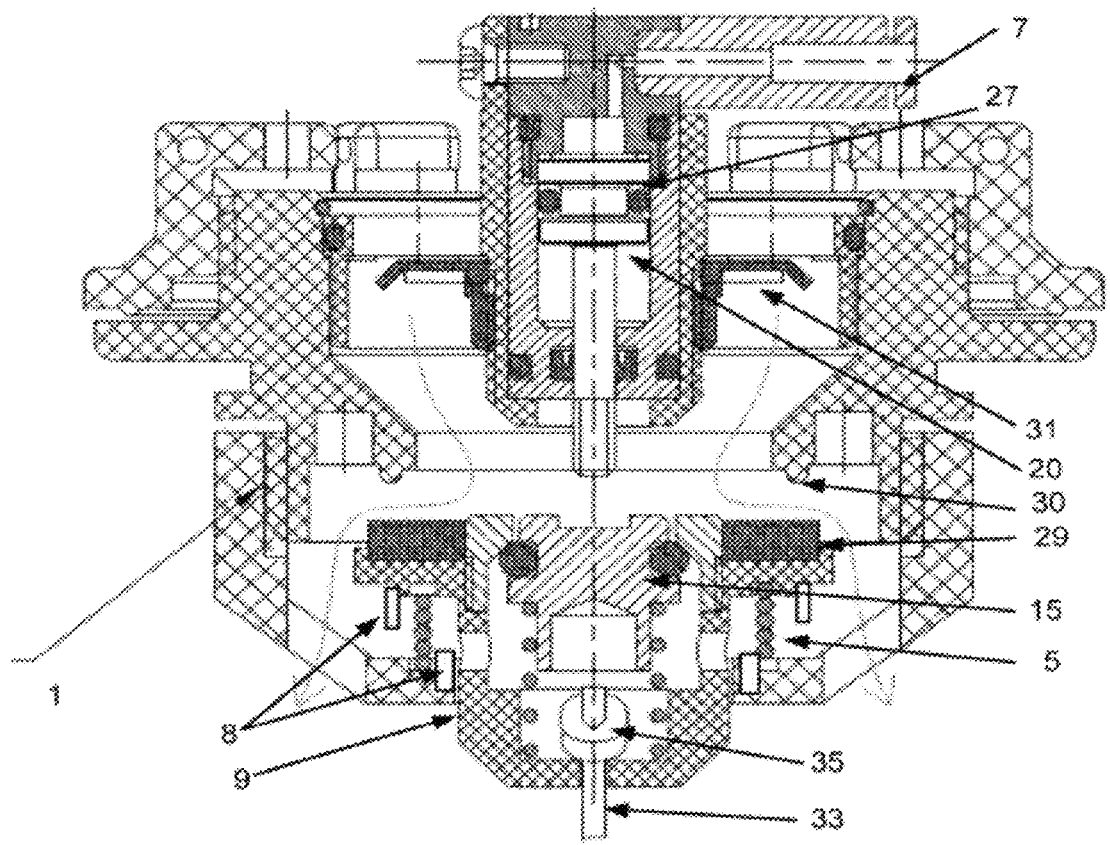
FIG. 2 shows a vent valve according to the present invention in the state where the valve is open through manual actuation or over-pressure.
Figure 3:
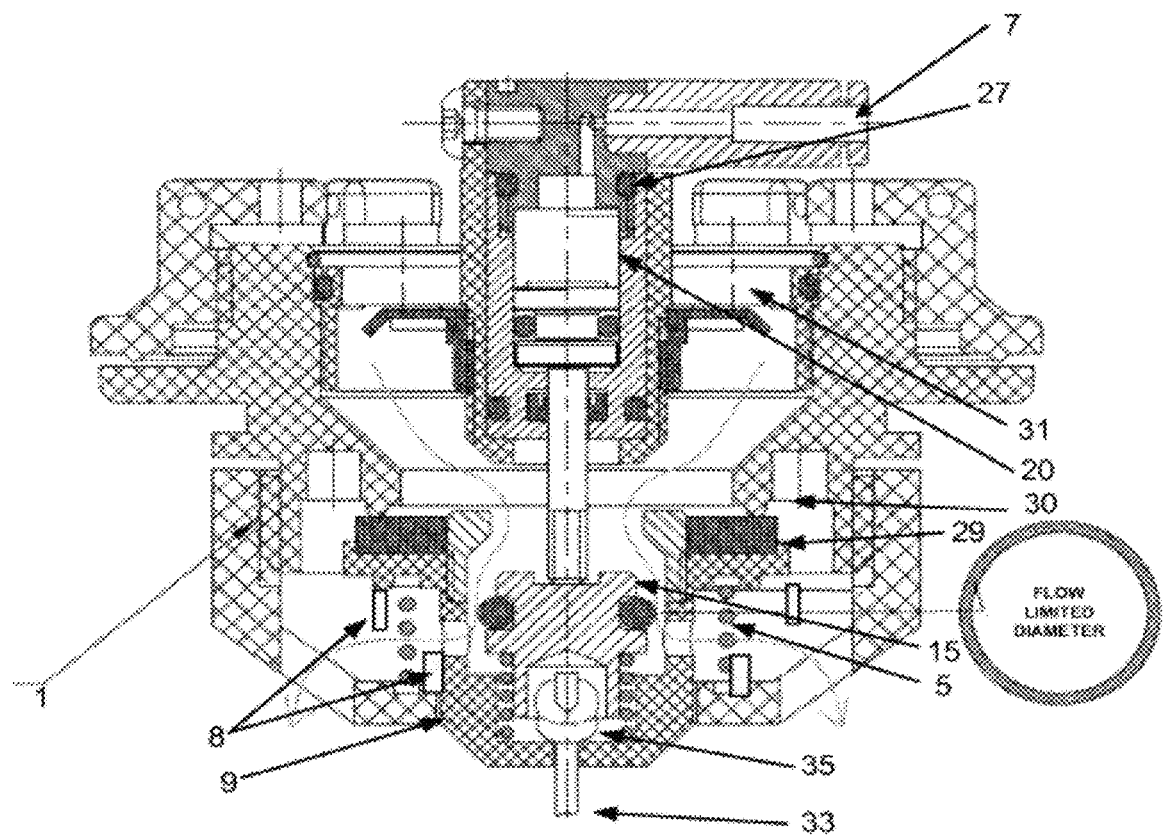
FIG. 3 shows a vent valve according to the present invention in the state where the valve is open through an automatic actuation channel only.

A compression spring (5) will apply an uneven force to the plug (29). Without further constraint, this would tend to allow the plug (29) to move at an angle with respect to the seat (30). To prevent that angular movement, the plug (29) is attached to a guide (9) that maintains the plug (29) such that the face of the plug (29) is parallel to the seat (30) at all times. In FIGS. 2 and 3 the guide (9) is constrained by a cylinder that forms part of the outer cover (1), and in FIG. 4 the guide (9) is constrained by the wall (8) that restricts the spring (5). It is highly preferable that the end in of the guide remains outside the cylinder that it moves in, to prevent angular forces jamming the guide (9) in the cylinder.

A hose (7) carrying the gas from the inflator to the actuators is preferably a narrow bore hose. Kynar hoses are available with a 0.8 mm bore and an outer diameter of 3.6 mm, which have the effect of limiting the maximum flow rate when used with typical BCD gas supply pressures to around 20 liters of gas flow per minute, and have a burst pressure exceeding the gas supply cylinder high pressure, such that if the first stage cylinder pressure regulator were to fail, then the hose (7) would not rupture, and therefore there is no risk of the bladder in the BCD being inflated suddenly. Moreover, use of a very small bore hose means that should the hose break, the flow rate into the bladder is much lower than the minimum vent rate if the diver uses the manual vent controls on the vent valves.

A one-way valve (31) is preferably fined, and the one-way valve (31) is preferably of an umbrella flapper valve construction to provide a positive cracking pressure to prevent water ingress into the BCD when the valve is open.

Vent valves with the features shown, namely an input (7), provide pressure which causes a piston (27) to move, opening a plug or stopper (29), allowing gas in the bladder to escape through a one-way valve (31). A manual pull-dump (33) is preserved in the preferred embodiment, allowing manual operation of the vent by the diver at any time. The pull-dump cord (35) may be singular or may be combined.

A novel feature of the vent valves in the preferred embodiment is the use of a wave spring to apply even pressure to the plug (29) such that seats evenly.

The use of the wave spring reduces the difference in the spring force across the plug (29) and hence reduces the angle it tries to adopt with respect to the valve seat (30). A wave spring is a type of compression spring built from a series of thin washers that have a wave-like profile. Compressing the washers, which are normally welded together, results in having a reactive force that is even around the circumference of the spring. A wave spring can also provide a greater extension for a particular spring force and spring bound size than a conventional wire compression spring, which can be advantageous in this application.

A key feature of the vent valve is that the plug (29) is not firmly attached to the piston (27), such that pulling the plug (29) via the cord (35) causes the plug (29) to lift off the seat (30) without the piston (27) having to move. The seat at the top of the piston (27) need not be attached to the plug (29).

Figure 4:
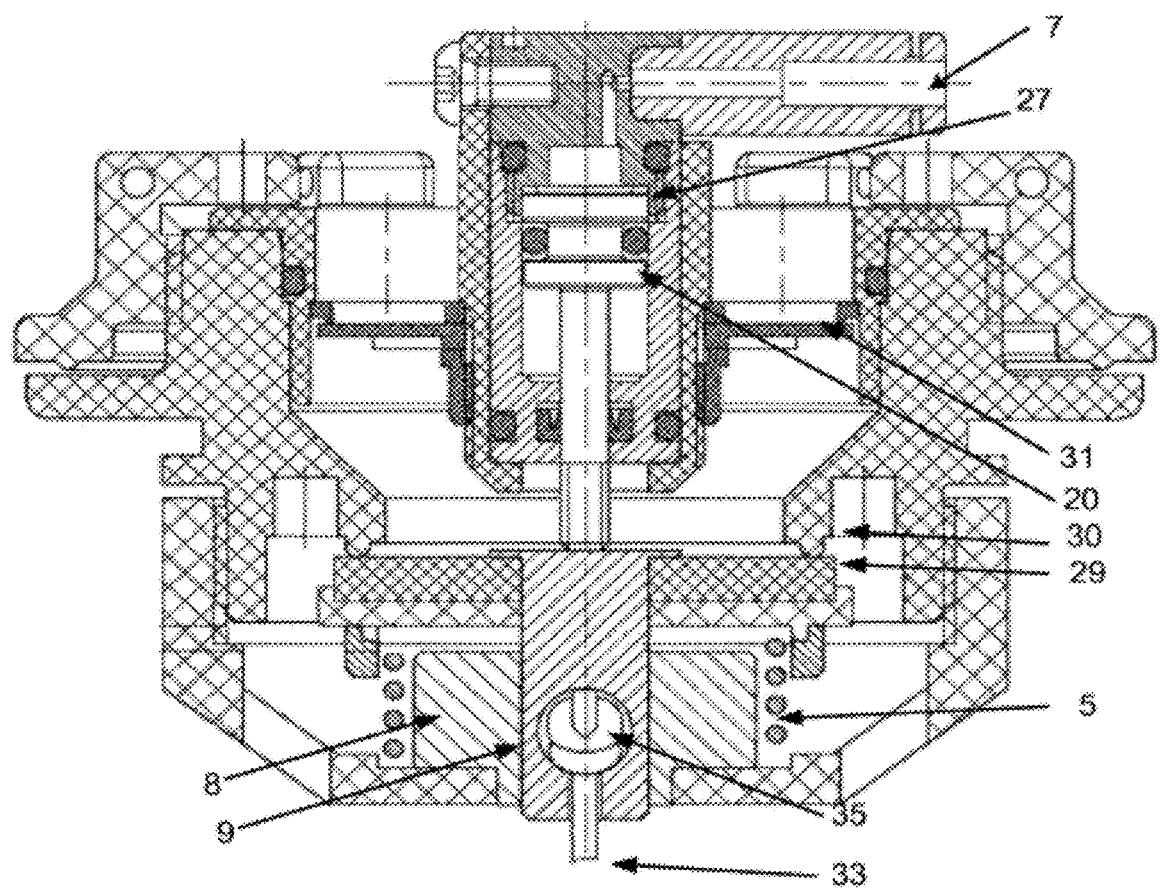
FIG. 4 shows a vent valve according to another embodiment of the present invention in the state where the valve is closed through an automatic actuation channel only.

In all FIGS. 1 to 4, the valve plug (29) is not fixed to the pneumatic piston rod (20): the rod can push the inner valve plug (15) in the embodiment in FIGS. 1 to 2 and the main plug (29) in FIG. 4, but does not prevent over-pressure from moving the plug to open the valve, nor prevent manual actuation opening the valve.

In the case of FIG. 4, the valve plug (29) is limited in its movement by adjustment of an exterior cap to the valve to provide a limited or restricted instantaneous flow rate. In that embodiment the instantaneous flow rate through the over-pressure action is also limited in applications where that is desirable.

In FIGS. 1 to 3 the automatic actuation of the valve does not move the main valve plug (29), but moves only the inner valve plug (15), through which gas flows. The instantaneous flow rate through that secondary valve comprising the inner valve plug (15) and seat is defined by choice of vent hole dimensions. This enables the automatic actuation of the valve to use a much lower instantaneous flow rate than that when the valve is opened manually or through over-pressure. For optimum automatic buoyancy control a ratio 8:1 or 16:1 is desired between the instantaneous flow rate in the over-pressure role and the instantaneous flow rate in the power (automated) actuation role.

The pneumatic power may be provided by an arrangement of gas valves that apply a lower gas pressure, such as 9 bar, to the hose (7) to activate the vent valve, but which in the quiescent or inactive state opens the gas line to the BCD bladder. When the gas hose (7) is a small bore hose then the volume of the gas vented to the bladder may be kept to a negligible amount.

An alternative to the pneumatic power to activate the vent valve is by use of a bellows containing a liquid such as alcohol or water or silicone oil, and pressure on the bellows by the user causes pressure to build up in the hose (7) and the valve to be opened. The spring bias to the bellows causes the liquid to pull back the piston when the pressure is removed. The pressure may be through a lever or directly on the bellows.

The bellows or the hose (7) has a means through which gas can be drained and fluid topped up, but such means may be in the form of a nipple or filling point: there is no need for a hydraulic reservoir. During the filling process, sufficient provision should be made for the thermal expansion of the hydraulic liquid: this can be accommodated by a partial fill such that expansion of the liquid extends the bellows and contraction causes them to shrink in size, but leaving sufficient movement for the manual action.

The bellows may be implemented in a variety of forms, including a thick walled balloon such as a silicone moulding, or it may be a telescoping moulding, or it may be a series of telescoping elements with O-ring seals.

Figure 5:
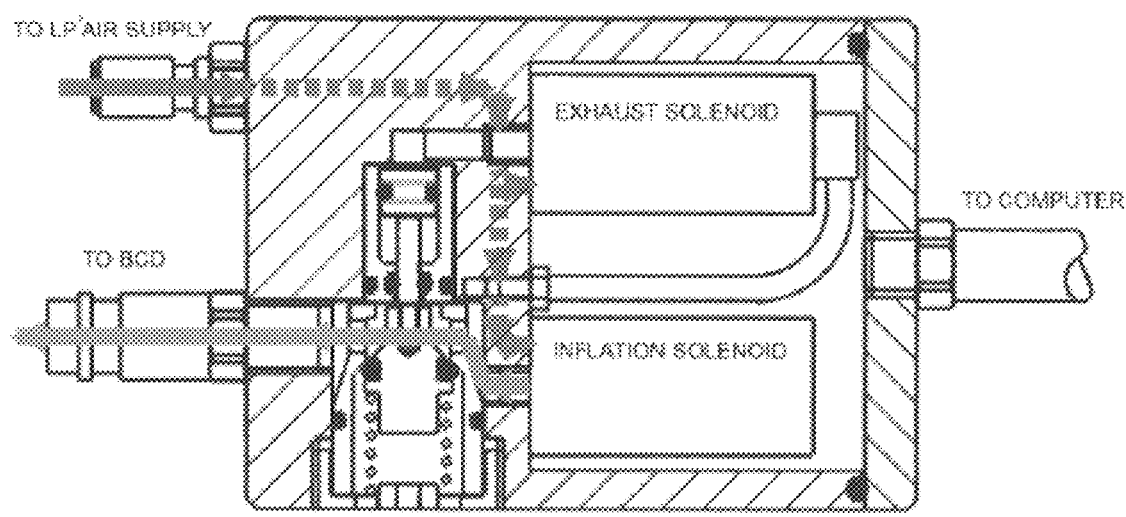
FIGS. 5-7 show the inflation and deflation of a buoyancy control device (BCD).
Figure 6:
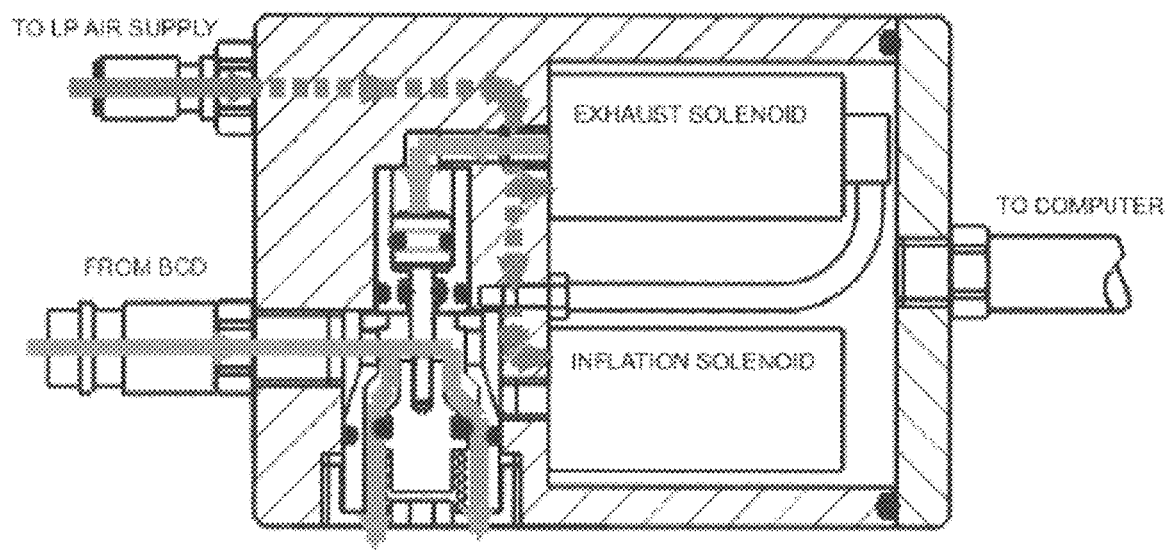
Figure 7:
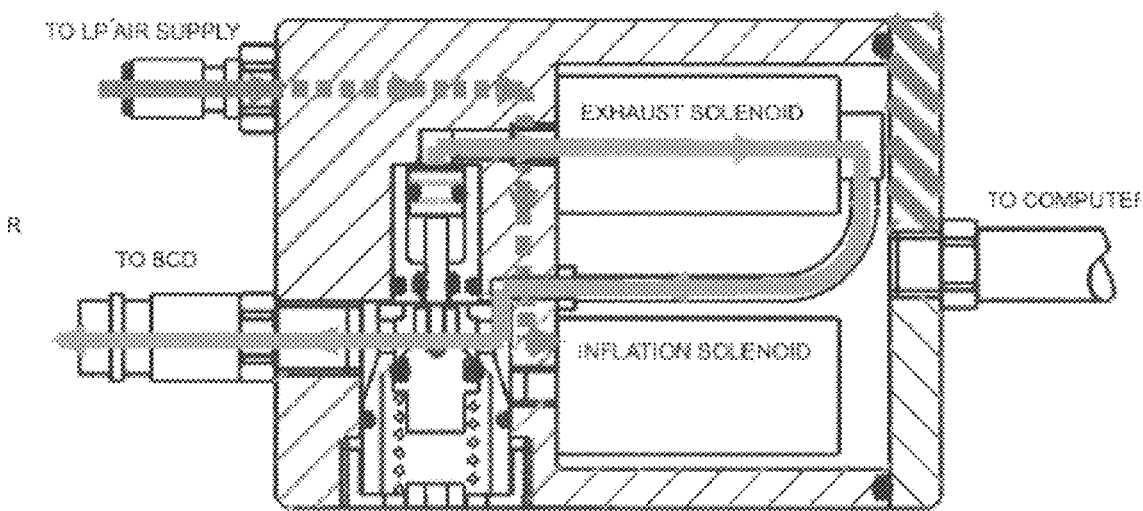

FIGS. 5-7 show the inflation and deflation of a buoyancy control device (BCD).

Figure 8:
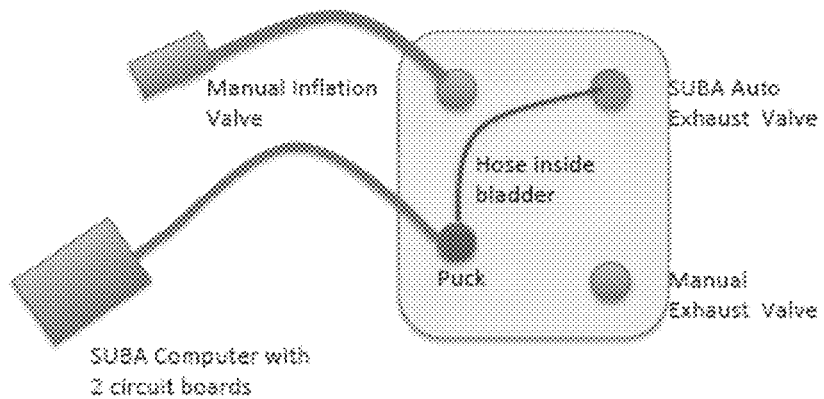
FIG. 8 shows an alternative example of SUBA configuration.
Figure 8:
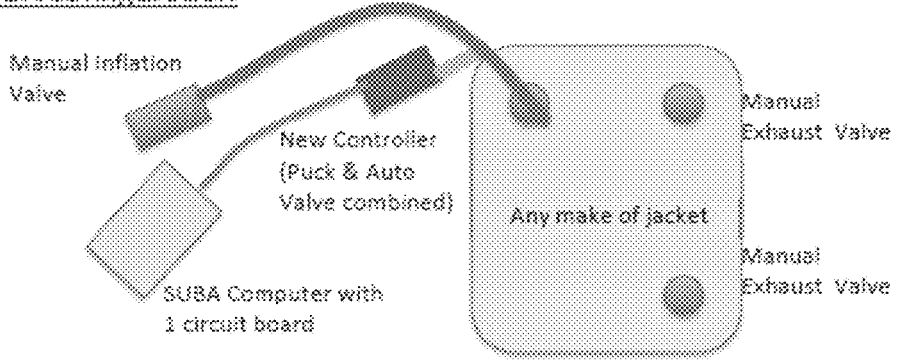

FIG. 8 shows an alternative example of SUBA configuration.

Figure 9:
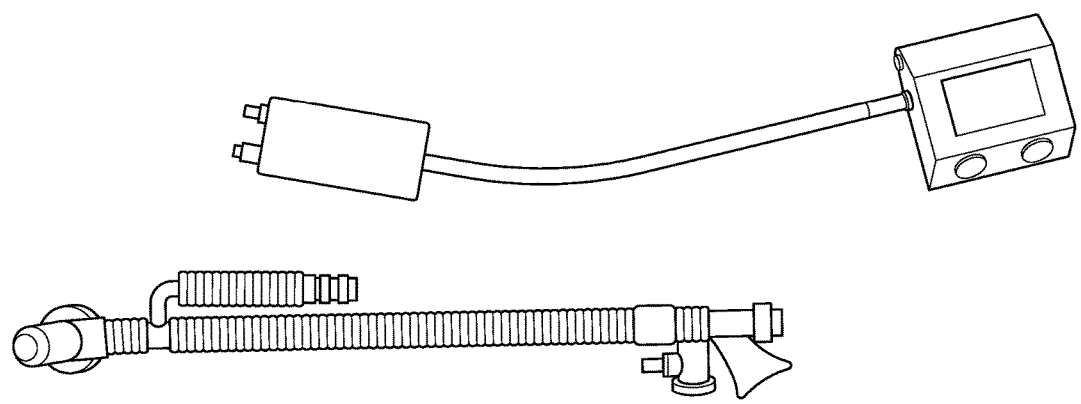
FIG. 9 shows an alternative example of SUBA as constructed.

FIG. 9 shows an alternative example of SUBA as constructed.

The invention claimed is:

1. A device for venting gas from a diver's buoyancy compensation bladder, the device comprising:
   a valve plug configured to open or to close a valve seat,
   a spring configured to apply force to the valve plug to close the valve seat,
   a piston configured to apply force to the valve plug to open the valve seat, and
   a manual pull dump configured to open the valve seat manually,
   wherein the spring is fully restrained for more than 50% of its length, and the movement of the valve plug is constrained by a centering mechanism that prevents the valve plug from moving laterally or angularly while the centering mechanism allowing movement with the face of the valve plug parallel to the valve seat along the axis of a line extending perpendicular to the valve seat under any combination of over-pressure or manual pulling action using the manual pull dump,
   wherein the valve plug is configured to be biased to open the valve seat by a pneumatically or hydraulically powered means enabling powered actuation of the valve plug and/or by the manual pull dump enabling manual actuation of the valve plug and the valve plug is configured to be biased to close the valve seat by a 'counterforce created by or assisted by the spring, providing a first instantaneous flow rate from the powered actuation of the valve plug lower than a second instantaneous flow rate from the actuation of the valve plug through over-pressure relief or the manual actuation.

2. A device according to claim 1 wherein the valve plug is operable by the powered actuation to open first vent holes and the valve plug is operable by the actuation through over-pressure relief or the manual actuation to open second vent holes wherein dimensions of the first vent holes and the second vent holes define the instantaneous flow rates from the powered actuation of the valve plug and from the actuation of the valve plug through over-pressure relief or the manual actuation.

3. A device according to claim 1 wherein a piston rod of the piston is configured such that in case of a loss of electrical or gas power the valve plug is operable by the spring to close the valve seat while the valve plug remains operable by the manual actuation.

4. A device according to claim 1 wherein the valve plug comprises an outer valve plug and an inner valve plug.

5. A device according to claim 1 wherein the centering mechanism comprises a guide maintaining the valve plug such that the face of the valve plug is parallel to the valve seat at all times, wherein the guide is constrained by a cylinder that forms part of an outer cover of the device.

6. A device according to claim 1 wherein the spring is restrained by walls arranged at opposite ends of the spring.

* * * * *